United States Patent
Kim et al.

(10) Patent No.: US 9,251,523 B2
(45) Date of Patent: Feb. 2, 2016

(54) METHOD AND SYSTEM FOR AUTOMATICALLY COMPLETED GENERAL RECOMMENDED WORD AND ADVERTISEMENT RECOMMENDED WORD

(75) Inventors: Taeil Kim, Seoul (KR); Young Kwang Park, Seoul (KR); JaeHo Choi, Gyeonggi-do (KR); Jae Geol Choi, Seoul (KR); Kyoo Min Im, Seoul (KR)

(73) Assignee: NAVER CORPORATION, Gyeonggi-Do (KR)

( * ) Notice: Subject to any disclaimer, the term of this patent is extended or adjusted under 35 U.S.C. 154(b) by 1093 days.

(21) Appl. No.: 12/282,880

(22) PCT Filed: Feb. 12, 2007

(86) PCT No.: PCT/KR2007/000746
§ 371 (c)(1),
(2), (4) Date: Sep. 12, 2008

(87) PCT Pub. No.: WO2007/108591
PCT Pub. Date: Sep. 27, 2007

(65) Prior Publication Data
US 2009/0094145 A1  Apr. 9, 2009

(30) Foreign Application Priority Data

Mar. 17, 2006 (KR) .................. 10-2006-0025035

(51) Int. Cl.
*G06Q 30/02* (2012.01)
*G06Q 30/04* (2012.01)
(52) U.S. Cl.
CPC ............... *G06Q 30/02* (2013.01); *G06Q 30/04* (2013.01)
(58) Field of Classification Search
CPC ............................. G06Q 30/02; G06Q 30/04
See application file for complete search history.

(56) References Cited

U.S. PATENT DOCUMENTS 5,890,172 A * 3/1999 Borman et al. ............... 715/205
6,393,415 B1   5/2002 Getchius et al.
(Continued)

FOREIGN PATENT DOCUMENTS

KR   10-1999-0078982   11/1999
KR   10-2005-0117628   12/2005

OTHER PUBLICATIONS

Japanese Office Action dated Dec. 21, 2010 on JP Application No. 2008-557201, which corresponds to U.S. Appl. No. 12/282,880.

*Primary Examiner* — Asfand Sheikh
(74) *Attorney, Agent, or Firm* — Harness, Dickey & Pierce, PLC (57) ABSTRACT

A system for autocompleting a general recommended word and an advertising recommended word, the system including: a first database configured to maintain an autocomplete general recommend word; a second database configured to maintain an autocomplete advertising recommended word; an autocomplete indexer component configured to index the autocomplete general recommended word and the autocomplete advertising recommended word; an autocomplete index database configured to classify and store the indexed autocomplete general recommended word and the autocomplete advertising recommended word; a web server configured to 1) receive an input query, and 2) transmit the input query to a predetermined query autocompletion server, and 3) receive the autocomplete general recommended word and the autocomplete advertising recommended word, and 4) display the autocomplete general recommended word and the autocomplete advertising recommended word; and the query autocompletion server is provided.

17 Claims, 8 Drawing Sheets

(56) References Cited

U.S. PATENT DOCUMENTS

| | | |
|---|---|---|
| 6,564,213 B1 * | 5/2003 | Ortega et al. |
| 6,704,727 B1 * | 3/2004 | Kravets |
| 7,002,491 B2 | 2/2006 | Robbins |
| 7,693,834 B2 * | 4/2010 | Gross ............... G06F 17/30864 707/713 |
| 7,818,208 B1 * | 10/2010 | Veach ................... G06Q 30/02 705/14.4 |
| 2003/0149686 A1 | 8/2003 | Drissi et al. |
| 2004/0254838 A1 * | 12/2004 | Guo et al. ................. 705/14 |
| 2005/0027822 A1 * | 2/2005 | Plaza ........................ 709/218 |
| 2005/0065806 A1 * | 3/2005 | Harik ............................ 705/1 |
| 2005/0096980 A1 * | 5/2005 | Koningstein ................ 705/14 |
| 2005/0228780 A1 * | 10/2005 | Diab et al. ................... 707/3 |
| 2005/0283468 A1 * | 12/2005 | Kamvar et al. .............. 707/3 |
| 2006/0129455 A1 * | 6/2006 | Shah ............................ 705/14 |
| 2006/0212350 A1 * | 9/2006 | Ellis et al. ................... 705/14 |
| 2008/0016034 A1 * | 1/2008 | Guha et al. .................. 707/3 |

* cited by examiner

| CONSONANT/ VOWEL UNIT | AUTOCOMPLETE ADVERTISING RECOMMENDED WORD | SYLLABLE UNIT | AUTOCOMPLETE ADVERTISING RECOMMENDED WORD | SUFFIX | AUTOCOMPLETE ADVERTISING RECOMMENDED WORD |
|---|---|---|---|---|---|
| ㄱ[g] | 게임나라 [GameNara] | 간[gan] | 간지나라 [GanjiNara] | 디카[dika] | 삼성디카 [SamsungDika] |
| | 고고게임 [GoGoGame] | | 간다여행 [GandaTour] | | 소니디카 [SoniDika] |
| | ... | | ... | | ... |
| ㄴ[n] | 넷마블 [NetMarble] | 나[na] | 나루토 [Naruto] | 성형 [sunghyung] | 미소성형 [MisoSunghyung] |
| | 노래줘 [Norajo] | | 나이키 [Naiki] | | 참진성형 [ChamjinSunghyung] |
| | ... | | ... | | ... |
| ㄷ[d] | 대한항공 [DehanHangong] | 당[dang] | 당나귀 [DangNaGui] | 우리[uri] | 한우리 [Hanuri] |
| | 디시인사이드 [DCinside] | | 당119닷컴 [Dang119Dotkom] | | 야우리 [Yauri] |
| ... | | ... | | ... | ... |

METHOD AND SYSTEM FOR AUTOMATICALLY COMPLETED GENERAL RECOMMENDED WORD AND ADVERTISEMENT RECOMMENDED WORD

CROSS REFERENCE TO RELATED APPLICATIONS

This application is a U.S. National Phase Application of International Application PCT Application No. PCT/KR2007/000746 filed on Feb. 12, 2007, which claims the benefit of priority from Korean Patent Application No. 10-2006-0025035 filed on Mar. 17, 2006. The disclosures of International Application PCT Application No. PCT/KR2007/000746 and Korean Patent Application No. 10-2006-0025035 are incorporated herein by reference.

TECHNICAL FIELD

The present invention relates to a method and system for autocompleting a general recommended word and an advertising recommended word, which can store an autocomplete general recommended word and an autocomplete advertising recommended word, extract the autocomplete general recommended word and the autocomplete advertising recommended word according to a user input query received from a user, and provide the user with the extracted autocomplete general recommended word and the autocomplete advertising recommended word and thereby can improve advertising effects.

BACKGROUND ART

When a query is entered from a user, a search website, which provides a search service, generally provides search results corresponding to the query, for example, web sites including the query, articles including the query, and images including the query as a file name.

Search services are currently being improved to increase users' convenience. Accordingly, when a user enters an appropriate query, the search service must provide satisfactory search results. Also, even when the user enters an inappropriate query, the search service must provide appropriate search results which can satisfy the user. Specifically, as users of search services are being expanded and also users who do not have enough background knowledge about appropriate queries increase, it is required to guide the users to make an appropriate query.

Also, when a user enters a mistyped character into a search window, how to handle the mistyped character and provide the user with satisfactory search results becomes an issue. The mistyped character may be generated, for example, 1) when a pronunciation is similar such as "Emma Wattson" and "Emma Watson", orthographies of borrowed words are confused, 2) when visually similar characters are confused, such as "the Uruguay Round" and "Anna's Diary", 3) when a user enters a special character via a keyboard, such as "]", and "!", and 4) when using alphabetical characters for Hangul. Accordingly, a proper solution for the entered mistyped character is required.

However, in the conventional search service, only passive solutions are utilized, such as 1) a method of converting a query into another query and providing search results using a predetermined converting list, when a user enters the query into a search window for a search request and the query is included in the converting list, and 2) a method of outputting search results even when the user enters a wrong query, and recommending at least one other query to the user.

Specifically, the method 1) may output search results with respect to a query that the user does not substantially desire. Also, the method 2) initially outputs search results with respect to the wrongfully entered query and subsequently recommends another query to the user. Accordingly, the user is required to select the other query and request the search again.

Also, according to the methods 1) and 2), search service providers must repeatedly perform predetermined operations, such as preparing any possible mistyped characters, and adding the same to a converting list or a recommendation list with a large number of human resources. Accordingly, some delays may occur in other important fields such as site registration or creating and searching of contents, which may also deteriorate productivity.

Accordingly, a new type of technology which can prevent a mistyped character before a user enters a query, and also can classify a query log for each index based on various standards, and automatically complete the query the user is currently entering, according to a user input query and a setting mode which are received from the user's web browser, so as to significantly improve a mistyped character correction function of a search service is required.

DISCLOSURE OF INVENTION

Technical Goals

An aspect of the present invention provides a method and system for autocompleting a general recommended word and an advertising recommended word, which can provide an autocomplete general recommended word and an autocomplete advertising recommended word according to a user input query received from a user and thereby can improve advertising effects.

Another aspect of the present invention also provides a method and system for autocompleting a general recommended word and an advertising recommended word, in which a web server can utilize a predetermined portion of a display area into an advertising area and sell an autocomplete advertising recommended word displayed in the advertising area to an advertiser and thereby a new business model can be constructed.

Another aspect of the present invention also provides a method and system for autocompleting a general recommended word and an advertising recommended word, which can determine an advertising cost with respect to an autocomplete advertising recommended word displayed in an advertising area, based on a number of clicks or a display period of time, and charge an account of an advertiser with the advertiser cost and thereby can create revenue based on displaying the autocomplete advertising recommended word for the user.

Another aspect of the present invention also provides a method and system for autocompleting a general recommended word and an advertising recommended word, which can provide an autocomplete query list so that a user may select a desired query and thereby readily complete a partial search query while the user is entering the query. In this instance, in the autocomplete query list, autocomplete general recommended words and autocomplete advertising recommended words are classified for each index based on various rules and thus the autocomplete query list may autocomplete a partial search query being entered by the user.

Technical Solutions

According to an aspect of the present invention, there is provided a system for autocompleting a general recommended word and an advertising recommended word, the system including: a first database configured to maintain an autocomplete general recommend word; a second database configured to maintain an autocomplete advertising recommended word; an autocomplete indexer component configured to index the autocomplete general recommended word and the autocomplete advertising recommended word according to any one of a consonant/vowel unit, a syllable unit, and a suffix; an autocomplete index database configured to classify and store the indexed autocomplete general recommended word and the autocomplete advertising recommended word into any one of a consonant/vowel unit index, a syllable unit index, and a suffix index; a web server configured to 1) receive a user input query from a user, and 2) transmit the user input query to a predetermined query autocompletion server, and 3) receive the autocomplete general recommended word and the autocomplete advertising recommended word from the query autocompletion server, and 4) display the autocomplete general recommended word and the autocomplete advertising recommended word on a predetermined webpage; and the query autocompletion server configured to receive the user input query from the web server, extract the autocomplete general recommended word and the autocomplete advertising recommended word from the autocomplete index database in association with the user input query, and transmit the extracted autocomplete general recommended word and the autocomplete advertising recommended word to the web server.

According to another aspect of the present invention, there is provided a method of autocompleting a general recommended word and an advertising recommended word, the method including the steps of: maintaining an autocomplete general recommended word in a first database; maintaining an autocomplete advertising recommended word in a second database; indexing the autocomplete general recommended word and the autocomplete advertising recommended word according to any one of a consonant/vowel unit, a syllable unit, and a suffix using an autocomplete indexer component; classifying and storing the indexed autocomplete general recommended word and the autocomplete advertising recommended word into any one of a consonant/vowel unit index, a syllable unit index, and a suffix index in an autocomplete index database; receiving, by a web server, a user input query from a user and transmitting the user input query to a query autocompletion server; receiving, by the query autocompletion server, the user input query from the web server; extracting, by the query autocompletion server, the autocomplete general recommended word and the autocomplete advertising word from the autocomplete index database in association with the user input query, and transmitting the extracted autocomplete general recommended word and the autocomplete advertising recommended word to the web server; and receiving, by the web server, the autocomplete general recommended word and the autocomplete advertising recommended word from the query autocompletion server, and displaying the autocomplete general recommended word and the autocomplete advertising recommended word on a predetermined webpage.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
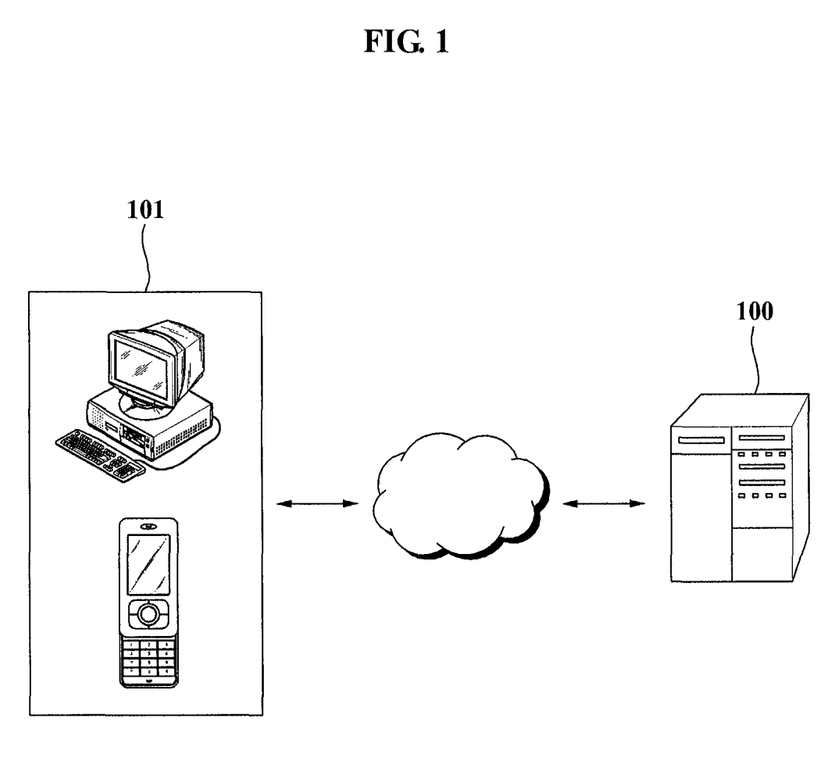
FIG. 1 illustrates a network connection of a system for autocompleting a general recommended word and an advertising recommended word according to an exemplary embodiment of the present invention.

FIG. 1 illustrates a network connection of a system for autocompleting a general recommended word and an advertising recommended word according to an exemplary embodiment of the present invention.

A system for autocompleting a general recommended word and an advertising recommended word (hereinafter, referred to as "recommended word autocompletion system") 100 maintains an autocomplete general recommended word in a first database, and maintains an autocomplete advertising recommended word in a second database. According to the present exemplary embodiment, the recommended word autocompletion system 100 indexes the autocomplete general recommended word and the autocomplete advertising recommended word according to any one of a consonant/vowel unit, a syllable unit, and a suffix using an autocomplete indexer component, and classifies and stores the indexed autocomplete general recommended word and the autocomplete advertising recommended word into any one of a consonant/vowel unit index, a syllable unit index, and a suffix index in an autocomplete index database.

A user accesses a web server of the recommended word autocompletion system 100 via a wired/wireless network using a user terminal 101 and enters a query.

In this instance, the web server receives a user input query from the user, and transfers the received user input query to a query autocompletion server of the recommended word autocompletion system 100. Also, the query autocompletion server receives the user input query from the web server, extracts an autocomplete general recommended word and an autocomplete advertising recommended word associated with the user input query from an autocomplete index server, and transmits the extracted autocomplete general recommended word and the autocomplete advertising recommended word to the web server. Accordingly, the web server receives the autocomplete general recommended word and the autocomplete advertising recommended word from the query autocompletion server, and displays the same on a webpage.

Figure 2:
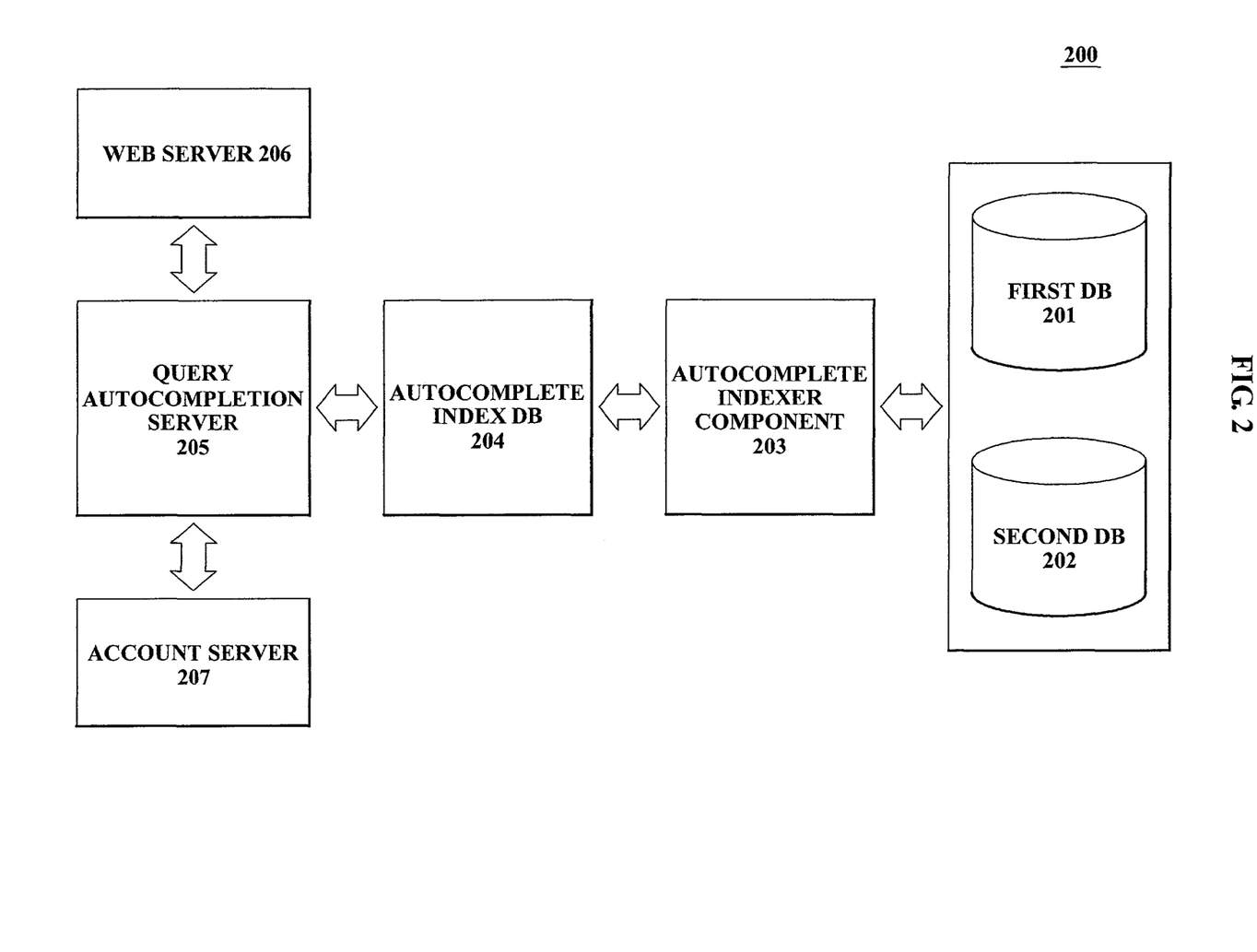
FIG. 2 is a block diagram illustrating a configuration of a system for autocompleting a general recommended word and an advertising recommended word according to an exemplary embodiment of the present invention.

FIG. 2 is a block diagram illustrating a configuration of a system for autocompleting a general recommended word and an advertising recommended word according to an exemplary embodiment of the present invention.

A recommended word autocompletion system 200 according to the present exemplary embodiment may include a first database 201 configured to maintain an autocomplete general recommend word, a second database 202 configured to maintain an autocomplete advertising recommended word, an autocomplete indexer component 203 configured to index the autocomplete general recommended word and the autocomplete advertising recommended word according to any one of a consonant/vowel unit, a syllable unit, and a suffix, an autocomplete index database 204 configured to classify and store the indexed autocomplete general recommended word and the autocomplete advertising recommended word into any one of a consonant/vowel unit index, a syllable unit index, and a suffix index, a web server 206 configured to receive a user input query from a user, and transmit the user input query to a predetermined query autocompletion server 205, and receive the autocomplete general recommended word and the autocomplete advertising recommended word from the query autocompletion server 205 and display the autocomplete general recommended word and the autocomplete advertising recommended word on a predetermined webpage, and the query autocompletion server 205 configured to receive the user input query from the web server 206, extract the autocomplete general recommended word and the autocomplete advertising recommended word from the autocomplete index database 204, and transmit the extracted autocomplete general recommended word and the autocomplete advertising recommended word to the web server 205.

Also, according to another exemplary embodiment of the present invention, the web server 206 may display the autocomplete general recommended word in a predetermined display area. Also, the web server 206 may utilize a predetermined portion of the display area into an advertising area, and display the autocomplete advertising recommended word in the advertising area. In this instance, the web server 206 may display the autocomplete advertising recommended word to be distinguished from the autocomplete general recommended word.

Also, according to still another exemplary embodiment of the present invention, the recommended word autocompletion system 200 further includes an account server 207 configured to charge an account of an advertiser with an advertising cost which is based on displaying the autocomplete advertising recommended word, sold to the advertiser, on the webpage. For example, the account server 207 may count a number of clicks that the user clicks the autocomplete advertising recommended word, and calculate the advertising cost based on the number of clicks. Also, the account server 207 may display the autocomplete advertising recommended word on the webpage during a predetermined period of time, and calculate the advertising cost based on the display period of time. Also, the account server 207 may sell the autocomplete advertising recommended word using a predetermined auction rule.

Figure 3:
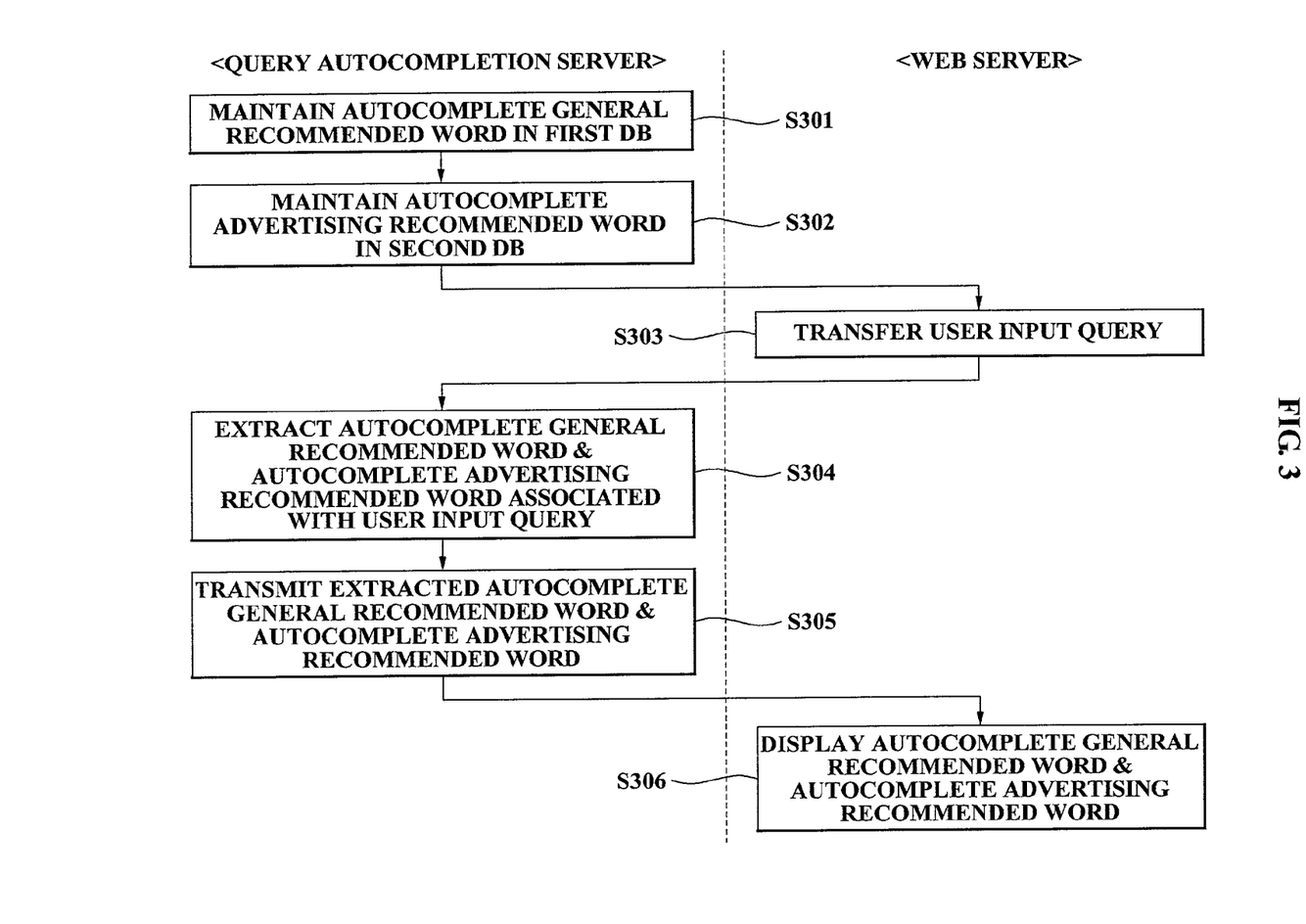
FIG. 3 is a flowchart illustrating a method of autocompleting a general recommended word and an advertising recommended word according to an exemplary embodiment of the present invention.

FIG. 3 is a flowchart illustrating a method of autocompleting a general recommended word and an advertising recommended word according to an exemplary embodiment of the present invention. The method of autocompleting the general recommended word and the advertising recommended word according to the present exemplary embodiment may be performed by the recommended word autocompletion system 200.

In operation S301, the query autocompletion server 205 of the recommended word autocompletion system 200 maintains an autocomplete general recommended word in the first database 201.

The autocomplete general recommended word may be a set of total queries that users enter in a predetermined search web site of the web server 206 of the recommended word autocompletion system 200. Also, the autocomplete general recommended word may include search frequency for each query. In this instance, the search frequency may be, for example, a type of statistical information which is generated by analyzing how many times a particular query has been inputted during a predetermined period.

In operation S302, the query autocompletion server 205 maintains an autocomplete advertising recommended word in the second database 202.

Figure 4:
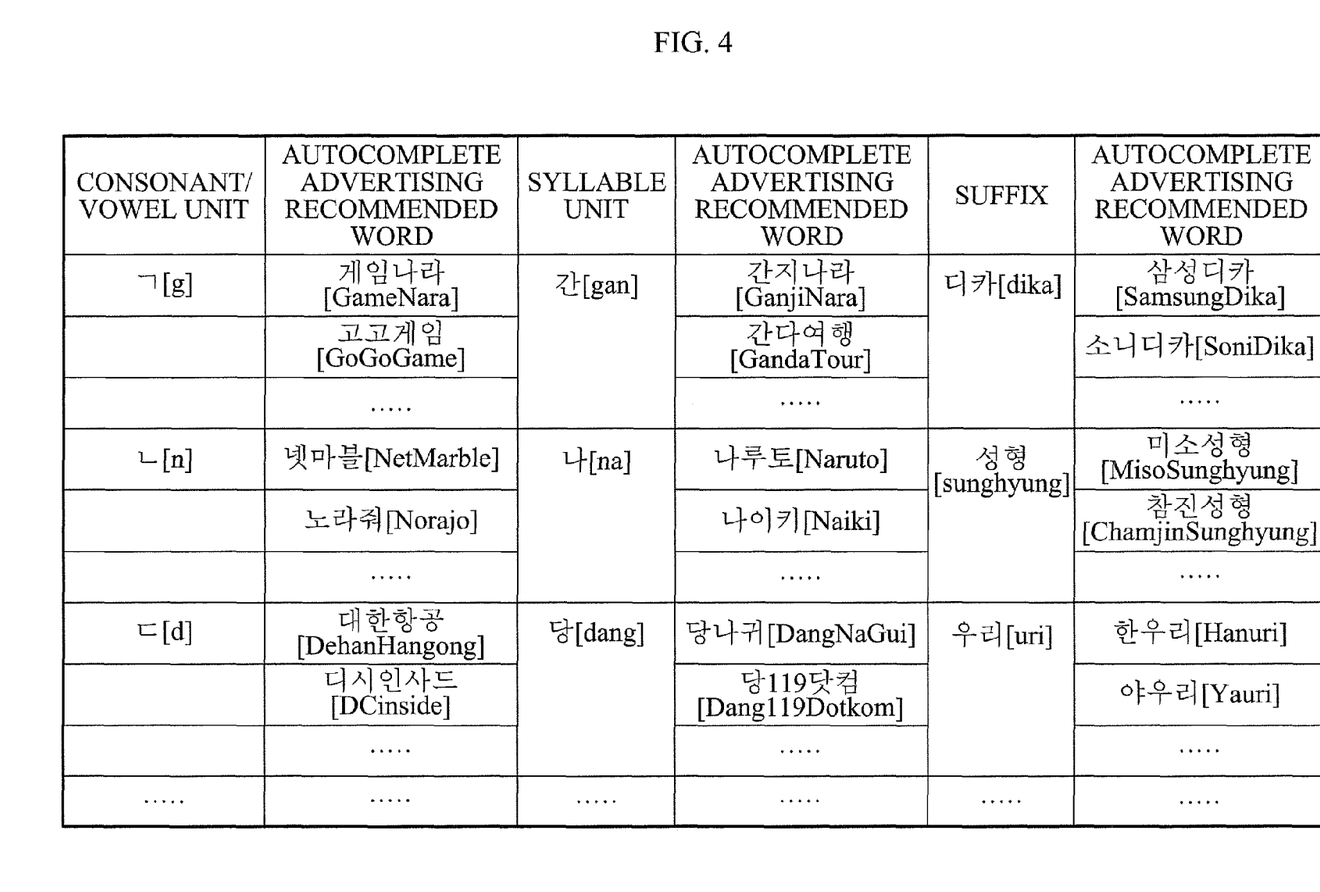
FIG. 4 illustrates an example of an second database storing an autocomplete advertising recommended word classified for each index according to an exemplary embodiment of the present invention.

FIG. 4 illustrates an example of the second database 202 storing autocomplete advertising recommended words classified for each index.

As shown in FIG. 4, the second database 202 may include autocomplete advertising recommended words for each index. In this instance, the autocomplete advertising recommended word indicates a recommended query for advertising and thus includes information about a Universal Resource Locator (URL) which directly connects with a corresponding homepage or enables corresponding advertising to be displayed as search results. For example, in the case of a consonant/vowel unit, '게임나라 [GameNara]', '고고게임 [GoGoGame]', and the like may be stored as autocomplete advertising recommended words for a consonant/vowel unit 'ㄱ [g]'. Also, '넷마블 [NetMarble]', '노라줘 [Norajo]', and the like may be stored as autocomplete advertising recommended words for a consonant/vowel unit 'ㄴ [n]'. Also, '대한항공 [DehanHangong]' (Korean Air in English), '디시인사드 [DCinside]', and the like may be stored as autocomplete advertising recommended words for a consonant/vowel unit 'ㄷ [d]'.

Also, in the case of a syllable unit, '간지나라 [GanjiNara]', '간다여행 [GandaTour]', and the like may be stored as autocomplete advertising recommended words for a syllable unit '간 [gan]'. Also, '나루토 [Naruto]', '나이키 [Naiki]', and the like may be stored as autocomplete advertising recommended words for a syllable unit '나 [na]'. Also, '당나귀 [DangNaGui]' (donkey in English), '당119닷컴 [Dang119Dotkom]', and the like may be stored as autocomplete advertising recommended words for a syllable unit '당 [dang]'.

Also, in the case of a suffix, '삼성디카 [SamsungDika] (Samsung digital camera in English)', '소니디카 [SoniDika] (Sony digital camera in English)', and the like may be stored as autocomplete advertising recommended words for a suffix '디카 [dika]'(digital camera in English). Also, '미소성형 [MisoSunghyung]', '참진성형 [ChamjinSunghyung]', and the like may be stored as autocomplete advertising recommended words for a suffix '성형 [sunghyung]' (plastic surgery in English). Also, '한우리[Hanuri]', '야우리[Yauri]', and the like may be stored as autocomplete advertising recommended words for the suffix '우리[uri]'.

In operation S303, the web server 206 receives a user input query from a user and transmits the user input query to the query autocompletion server 205. In the present exemplary embodiment, the web server 206 may receive the user input query and a setting mode from the user. In this instance, the setting mode may include selection information about at least one of the consonant/vowel unit index, the syllable unit index, and the suffix index.

In operation S304, the query autocompletion server 205 receives the user input query from the web server 206, and extracts the autocomplete general recommended word and the autocomplete advertising recommended word from the autocomplete index database 204 in association with the user input query.

The autocomplete indexer component 203 indexes the autocomplete general recommended word, stored in the first database 201, and the autocomplete advertising recommended word, stored in the second database 202, according to any one of a consonant/vowel unit, a syllable unit, and a suffix. For the above operation, the autocomplete indexer component 203 may include a consonant/vowel unit indexer component, a syllable unit indexer component, and a suffix indexer component.

Accordingly, a single query may be classified using only one method, and also classified as all of the consonant/vowel unit, the syllable unit, and the suffix according to a method where the query is indexed. As an example, a query "당나귀[DangNaGui]" may be indexed into "ㄷ[d]", "다[da]", "당[dang]", "당ㄴ[dangn]", "당나[dangna]", "당낙[dangnag]", "당나구[dangnagu]", and "당나귀[dangnagui]" according to the consonant/vowel unit. Also, the query may be indexed into "당[Dang]", "당나[DangNa]", and "당나귀[DangNaGui]" according to the syllable unit, and may also be indexed into "귀[Gui]", "나귀[NaGui]", and "당나귀[DangNaGui]" according to the suffix.

The greatest distinguishing characteristic of Hangul (Korean), which is different from other foreign characters such as Chinese characters, is that Hangul consists of consonant units and vowel units. Specifically, Hangul includes basic consonants and vowels which include 19 initial sounds, 21 intermediate sounds, and 28 final sounds, and regularly combine the basic consonants and vowels to generate a word. Depending upon the character of Hangul, the consonant/vowel indexer component of the autocomplete indexer component 203 functions to classify queries maintained in the first database 201 according to the consonant/vowel unit.

The term "consonant/vowel unit" used throughout the present specification includes a general meaning of consonants and vowels, such as the initial sounds, the intermediate sounds, and the final sounds, and also includes all the characters and words which are generated by combining the initial sound and the final sound. As an example, "다[da]" may be divided into two consonant/vowel units, such as "ㄷ[d]" and "ㅏ[a]". Also, "다[da]" itself may correspond to a single consonant/vowel unit.

Also, in the present invention, the term "consonant/vowel unit" includes a concept of a "minimal input unit of an input terminal". As an example, "ㅗ[o]" and "ㅏ[a]" must be entered to generate the single vowel "ㅘ[wa]" in a Hangul dual mode keyboard. In the case of a simple consonant/vowel unit, a word "와우[wawo]" may be indexed into "ㅇ[w]", "와[wa]", "와ㅇ[waw]", and "와우[wawo]". However, in the present invention, as described above, the "consonant/vowel unit" includes the concept of the "minimal input unit of the input terminal". Accordingly, in the case of a Hangul dual mode keyboard, the word "와우[wawo]" may be indexed into "ㅇ[w]", "오[wo]", "와[wa]", "왕[waw]", and "와우[wawo]". Also, when the input terminal is changed into another terminal following a different input method, indexes of the minimal input unit may be changed.

Also, the syllable unit indexer component of the autocomplete indexer component 203 functions to classify autocomplete general recommended words maintained in the first database 201 according to the syllable unit. Also, the suffix indexer component of the autocomplete indexer component 203 functions to classify autocomplete advertising recommended words maintained in the second database 202 according to the suffix.

The suffix is a kind of affix, and is added to the end of a word to add a meaning, and thereby generally generates another word. Also, the suffix may not be used alone, and is combined to the root of a word to add various meanings. As an example, suffixes, which are added to substantives, may include '-님[nim]' which designates a honorific title, '-수[su]', '-자[ja]', etc. which designates an operating subject, '-들[dul]' which designates pluralality, and '-화[hwa]', '-식[sik]', '적[guk]', and the like.

However, in the present invention, the term "suffix" includes the same usage as in the English language, and also designates all the words and characters which can be added to a tail of a word.

As an example, '국가[gukga]' (nation in English) does not correspond to a general meaning of a suffix, but can be added to the tail of another world, such as '민주국가[Minju Gukga]', '법치국가[Bupchi Gukga]', '애국가[E Gukga]', and the like. Accordingly, in the present invention, "국가[Gukga]" falls within the scope of the suffix. As described above, in the present invention, the "suffix" corresponds to "a syllable unit index from a tail of a word". As an example, a term "애국가[HyungWeGa]" itself may not be a complete noun, such as "국가[gukga]", but completes a query such as "미소성형외과[Miso SungHyungWeGa]" and "홍길동정형외과[HongGilDong JungHyungWeGa]". Accordingly, "형외과[HyungWeGa]" also falls within the scope of the suffix.

In the present exemplary embodiment, a single query may be divided using only a single index, and also may be divided using all of the consonant/vowel unit, the syllable unit, and the suffix according to a method where the query is indexed. As an example, an autocomplete general recommended word "당나귀[DangNaGui]" may be recorded in the consonant/vowel unit index, such as "ㄷ[d]", and also recorded in the syllable unit index, such as "당[dang]". Also, the autocomplete general recommended word "당나귀[DangNaGui]" may be recorded in the suffix index, such as "귀[gui]".

According to another exemplary embodiment of the present invention, the query autocompletion server 205 extracts at least one autocomplete advertising recommended word for advertising, and extracts at least one autocomplete general recommended word for the user convenience. Accordingly, a comparatively smaller number of autocomplete advertising recommended words than autocomplete general recommended words may be extracted. Specifically, the query autocompletion server 205 may extract, for example, only one or two autocomplete advertising recommended words less than the extracted autocomplete general recommended words.

According to still another exemplary embodiment of the present invention, the query autocompletion server 205 may extract a predetermined number of autocomplete general recommended words in an order of search frequency in association with the user input query when extracting autocomplete general recommended words.

As an example, when a user enters "ㄷ [d]" into a search window, the query autocompletion server 205 may extract, for example, only eight autocomplete general recommended words, without extracting all autocomplete general recommended words starting with "ㄷ [d]". In this instance, the query autocompletion server 205 may determine eight autocomplete general recommended words in an order of search frequency. Accordingly, only most probable queries may be provided for the user.

In operation S305, the query autocompletion server 205 transmits the extracted autocomplete general recommended word and the autocomplete advertising recommended word to the web server 206.

In operation S306, the web server 206 receives the autocomplete general recommended word and the autocomplete advertising recommended word, and displays the autocomplete general recommended word and the autocomplete advertising recommended word on a predetermined webpage. In this instance, the web server 206 may utilize a predetermined portion of a display area into an advertising area, display the autocomplete general recommended word in the display area, and display the autocomplete advertising recommended word in the advertising area. As an example, the web server 206 may display the autocomplete advertising recommended word in a larger font than the autocomplete general recommended word. Also, the web server 206 may display the autocomplete advertising recommended word using a different color from the autocomplete general recommended word or may underline the autocomplete advertising recommended word.

Figure 5:
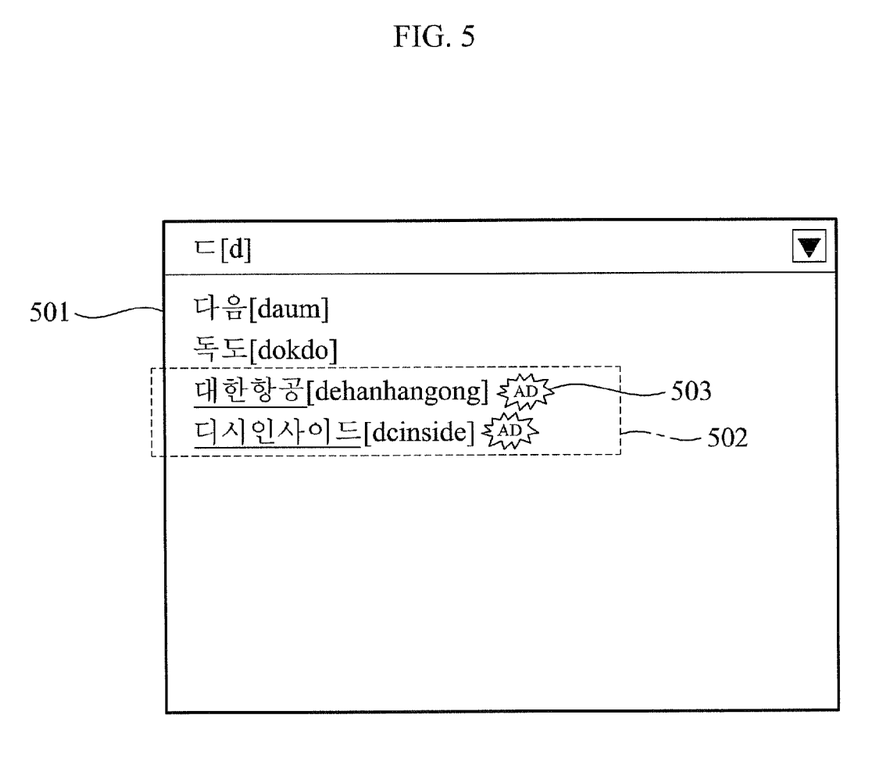
FIG. 5 illustrates an example of an autocomplete query list provided for a user when the user enters a query based on a consonant/vowel unit according to an exemplary embodiment of the present invention.

FIG. 5 illustrates an example of an autocomplete query list provided for a user when the user enters a query based on a consonant/vowel unit according to an exemplary embodiment of the present invention.

As shown in FIG. 5, when the user enters "ㄷ [d]" in a search window, a setting mode is automatically selected as selection information about the consonant/vowel unit. The recommended word autocompletion system 200 may perform operations S303 through 306 and thereby display the autocomplete query list below the search window. In this instance, the autocomplete query list may include autocomplete general recommended words, such as '다음 [daum]', '독도 [dokdo]' (Korean island), and the like, and autocomplete advertising recommended words, such as '대한항공 [dehanhangong]' (Korean Air in English), '디시인사이드 [dcinside]', and the like, which are classified as the consonant unit index "ㄷ [d]".

In this instance, the web server 206 may utilize a predetermined portion of a display area 501 into an advertising area 502, and display the autocomplete advertising recommended word in the advertising area 502 which is an eye-catching place for the user. Also, as shown in FIG. 5, the advertising area 502 may be set to a center portion of the display area 501. In this instance, the web server 206 may display the autocomplete advertising recommended words to be distinguished from the autocomplete general recommended words. Also, the web server 206 may display an advertising icon 503 with the autocomplete advertising recommended word so that the user may readily recognize the autocomplete advertising recommended word.

Figure 6:
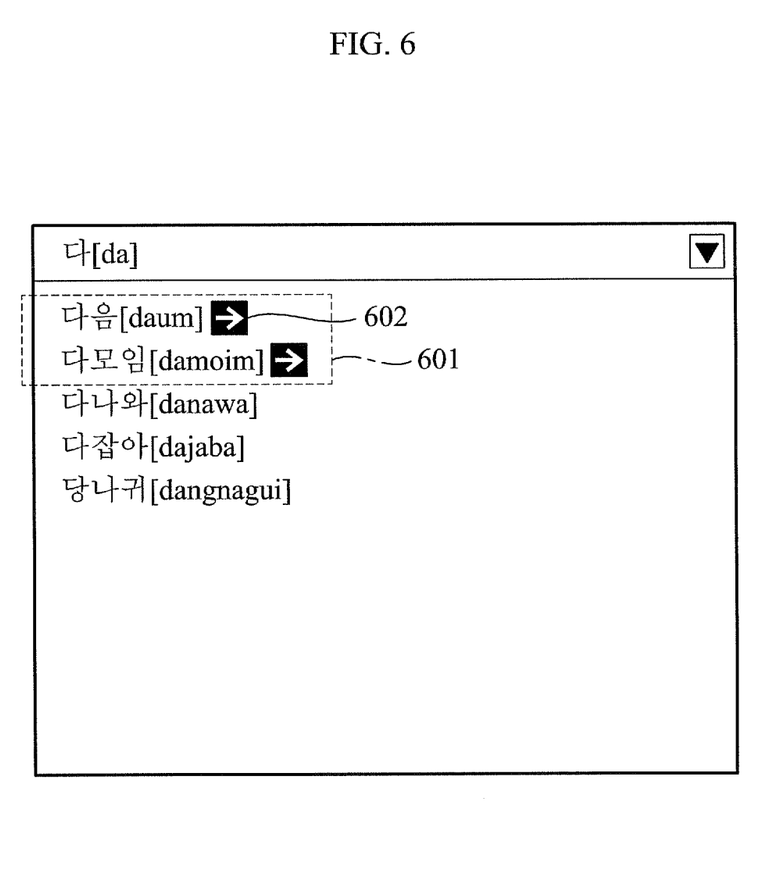
FIG. 6 illustrates an example of an autocomplete query list provided for a user when a consonant/vowel unit is selected as a setting mode according to an exemplary embodiment of the present invention.

FIG. 6 illustrates an example of an autocomplete query list provided for a user when a consonant/vowel unit is selected as a setting mode according to an exemplary embodiment of the present invention.

As shown in FIG. 6, when the user enters "다 [da]" into a search window, a setting mode may correspond to selection information about any one of a consonant/vowel unit index, a syllable unit index, and a suffix index. In FIG. 6, the autocomplete query list may be displayed for the user when the consonant/vowel unit index is selected as the setting mode.

As described above, except when a last syllable of a user input query is terminated with an initial sound, the setting mode for any user input query may include selection information about any one of the consonant/vowel unit index, the syllable unit index, and the suffix index. In this instance, different query search results may be displayed depending upon which one is selected as the setting mode.

In this instance, the setting mode may be selected by the user or may be randomly selected by the recommended word autocompletion system 200.

As described above, the recommended word autocompletion system 200 may receive "다 [da]" as the user input query and "consonant/vowel unit index" as the setting mode, and then performs operations S303 through S306, and thereby display the autocomplete query list below the search window. In this instance, the autocomplete query list may include autocomplete general recommended words, such as '다나와 [danawa]', '다잡아 [dajaba]', '당나귀 [dangnagui]', and the like, and autocomplete advertising recommended words, such as '다음 [daum]', '다모임 [damoim]', and the like, which are classified as the consonant unit index "다".

In this instance, the web server 206 may utilize an upper portion of a display area as an advertising area 601, and display the autocomplete advertising recommended words in an upper portion of the autocomplete query list to be distinguished from autocomplete general recommended words. Also, as show in FIG. 6, the web server 206 may display an advertising icon 602 with the autocomplete advertising recommended word.

According to the present exemplary embodiment, since autocomplete advertising recommended words may be stored for each index of queries, different autocomplete advertising recommended words may be displayed for each of a consonant, a syllable unit index, and a suffix index. As an example, '다음 [daum]' may be set to be displayed as an autocomplete advertising recommended word for only the syllable unit index. Accordingly, in the case of the consonant/vowel unit index as shown in FIG. 6, '다음 [daum]' may be displayed as the autocomplete general recommended word, not the autocomplete advertising recommended word. In the case of the syllable unit index, '다음 [daum]' may be displayed as the autocomplete advertising recommended word.

Figure 7:
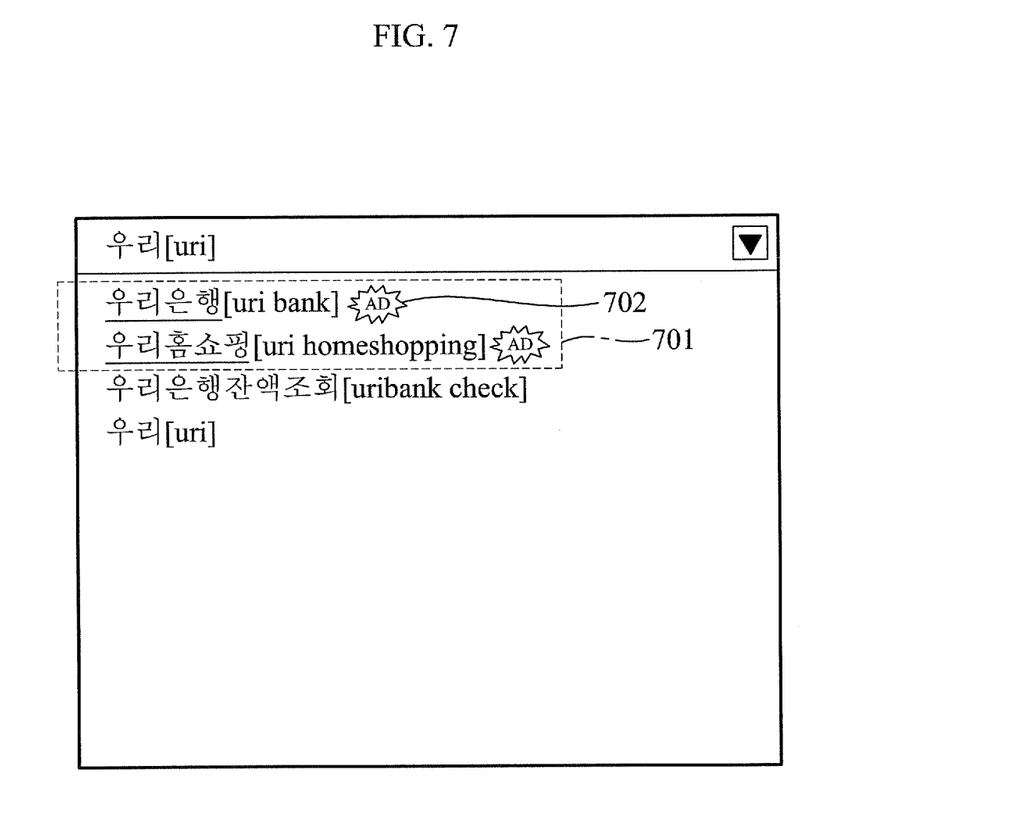
FIG. 7 illustrates an example of an autocomplete query list provided for a user when a syllable unit index is selected as a setting mode according to an exemplary embodiment of the present invention.

FIG. 7 illustrates an example of an autocomplete query list provided for a user when a syllable unit index is selected as a setting mode according to an exemplary embodiment of the present invention.

When the user enters "우리 [uri]" into a search window, and the syllable unit index is selected as a setting mode, the autocomplete query list as shown in FIG. 7 may be displayed for the user. As described above, the setting mode may be selected by the user or may be randomly selected by the recommended word autocompletion system 200.

As described above, the recommended word autocompletion system 200 may receive '우리 [uri]' as the user input query and "syllable unit index" as the setting mode and then perform operations S303 through S306, and thereby display the autocomplete query list below the search window. In this instance, the autocomplete query list may include autocomplete general recommended words, such as '우리은행잔액조회 [uribank check]', '우리 [uri]', and the like, and autocomplete advertising recommended words, such as '우리은행 [uri bank]', '우리홈쇼핑 [uri homeshopping]', and the like, which are classified as the syllable unit index "우리 [uri]".

In this instance, the web server 206 may display the autocomplete advertising recommended words in an advertising area 701 to be distinguished from autocomplete general recommended words. Specifically, the web server 206 may utilize an upper portion of the autocomplete query list as the advertising area 701 and display the autocomplete advertising recommended words in the upper portion of the autocomplete query list. Also, the web server 206 may display an advertising icon 702 with the autocomplete advertising recommended word.

Figure 8:
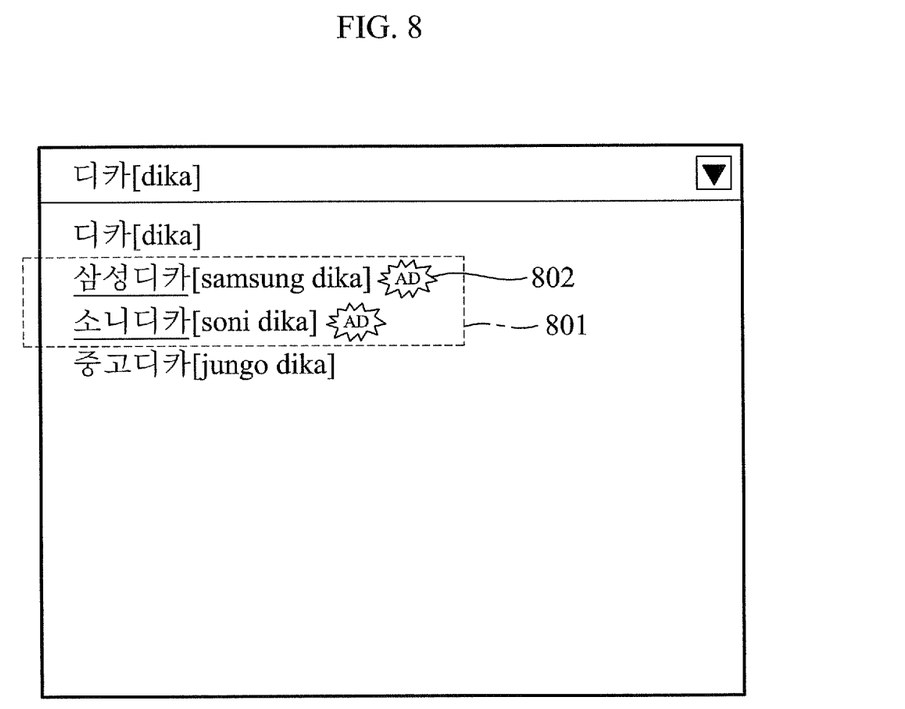
FIG. 8 illustrates an example of an autocomplete query list provided for a user when a suffix index is selected as a setting mode according to an exemplary embodiment of the present invention.

FIG. 8 illustrates an example of an autocomplete query list provided for a user when a suffix index is selected as a setting mode according to an exemplary embodiment of the present invention.

When the user enters "디카 [dika]" into a search window, and the suffix index is selected as a setting mode, the autocomplete query list as shown in FIG. 8 may be displayed for the user. As described above, the setting mode may be selected by the user or may be randomly selected by the recommended word autocompletion system 200.

As described above, the recommend word autocompletion system 200 receives "디카 [dika]" as the user input query, and "suffix index" as the setting mode and then performs operations S303 through S306 and thereby displays the autocomplete query list below the search window. In this instance, the autocomplete query list may include autocomplete general recommended words, such as '디카 [dika]', '중고디카 [jungo dika]', and the like, and autocomplete advertising recommended words, such as '삼성디카 [samsung dika]', '소니디카 [soni dika]', and the like, which are classified as the suffix index "디카 [dika]".

In this instance, the web server 206 may utilize an intermediate portion of a display area as an advertising area 801, and display the autocomplete advertising recommended words in the advertising area 801 to be distinguished from the autocomplete general recommended words. Also, the web server 206 may display an advertising icon 802 with the autocomplete advertising recommended word.

According to an exemplary embodiment of the present invention, the account server 207 calculates an advertising cost based on a number of clicks or a display period of time. Specifically, the account server 207 may count a number of clicks that the user clicks the autocomplete advertising recommended word, and calculate the advertising cost based on the number of clicks. As an example, the account server 207 may calculate the advertising cost based on the number of clicks, such as 100 won per click, 7000 won per 100 clicks, and the like, or based on the display period of time, such as 10,000 won for ten days, 100,000 won for thirty days, and the like. The account server 207 may create benefits by charging an account of an advertiser, and registering the autocomplete advertising recommended word. Also, the account server 207 may sell the autocomplete advertising recommended word using an auction rule.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

According to the present invention, there is provided a method and system for autocompleting a general recommended word and an advertising recommended word, which can provide an autocomplete general recommended word and an autocomplete advertising recommended word according to a user input query received from a user and thereby can improve advertising effects.

Also, according to the present invention, there is provided a method and system for autocompleting a general recommended word and an advertising recommended word, in which a web server can utilize a predetermined portion of a display area into an advertising area and sell an autocomplete advertising recommended word displayed in the advertising area to an advertiser and thereby a new business model can be constructed.

Also, according to the present invention, there is provided a method and system for autocompleting a general recommended word and an advertising recommended word, which can determine an advertising cost with respect to an autocomplete advertising recommended word displayed in an advertising area, based on a number of clicks or a display period of time, and charge an account of an advertiser with the advertiser cost and thereby can create revenue based on displaying the autocomplete advertising recommended word for the user.

Also, according to the present invention, there is provided a method and system for autocompleting a general recommended word and an advertising recommended word, which can provide an autocomplete query list so that a user may select a desired query and thereby readily complete a partial search query while the user is entering the query. In this instance, in the autocomplete query list, autocomplete general recommended words and autocomplete advertising recommended words are classified for each index based on various rules and thus the autocomplete query list may autocomplete a partial search query being entered by the user.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system using one or more servers comprising one or more processors for providing a recommended search query and an advertising word, the system comprising:
   a non-transitory storage device coupled to the one or more servers, the non-transitory storage device comprising a plurality of search queries and a plurality of advertising words, wherein
   an index component configured to make an index of the search queries and the advertising words according to one of a consonant/vowel, a syllable, a suffix or any combination thereof and the index is classified and stored in the non-transitory storage device;

a web server configured to receive a partial or full search query in real-time and to transmit the partial or full search query to a query autocompletion server, the partial or full search query being entered in a search display area of a web page; and upon detection of the partial or full search query, the query autocompletion server is configured to generate an auto-completed search query and an auto-completed advertising word according to the index, the generation occurring in real-time as the partial or full search query is entered, wherein the generated auto-completed search query and the auto-completed advertising word are displayed in real-time in a user interface window associated with the search display area, the displaying including using a visual indicator to distinguish the auto-completed advertising word from the auto-completed search query.

2. The system of claim 1, wherein the web server is configured to display the auto-completed advertising word distinguishable from the auto-completed search query using one of a larger font, a different color, an underline or any combination thereof.

3. The system of claim 1, further comprising:
an account server configured to charge an account of an advertiser with an advertising cost for displaying the auto-completed advertising word on the user interface window associated with the search display area.

4. The system of claim 3, wherein the account server is configured to count a number of user clicks associated with the auto-completed advertising word, and to calculate the advertising cost based on the number of clicks.

5. The system of claim 3, wherein the account server is configured to display the auto-completed advertising word on the user interface window associated with the search display area during a period of time, and to calculate the advertising cost based on a number of clicks during the period of time.

6. The system of claim 1, wherein the displayed in the user interface window associated with the search display area comprises:
distinguishably displaying one of the auto-completed search query or the auto-completed advertising word according to a setting mode.

7. A method that uses a processor to provide a search query and an advertising word related to the search query, the method comprising:
receiving a search query in real-time from a user terminal, wherein
a plurality of search queries and a plurality of advertising words related to the search queries are stored in a database;
indexing, by the processor, the search queries and the advertising words by correlating the search queries and the advertising words with one of a consonant/vowel, a syllable, a suffix, or any combination thereof, wherein the indexed search queries and advertising words are classified and stored in the database;
upon detection of the partial or full search query, providing an auto-completed search query and an auto-completed advertising word according to the indexing, the providing occurring in real-time as the partial or full search query is received; and
causing display of the auto-completed search query and the auto-completed advertising word in a user interface window associated with a search display area of the user terminal, the displaying including using a visual indicator to distinguish the auto-completed advertising word from the auto-completed search query.

8. The method of claim 7, further comprising:
transmitting the partial or full search query from a web server to a query server.

9. The method of claim 7 wherein the completed search query comprises at least one general search word and at least one auto-completed advertising word corresponding to the general search query.

10. The method of claim 7, further comprising:
distinguishably displaying the at least one of the auto-completed search query, the auto-completed advertising word, or both the auto-completed search query and the auto-completed advertising word in the user interface window associated with the search display area.

11. The method of claim 10, wherein the distinguishably displaying comprises displaying at least one auto-completed advertising word on a portion of the user interface window associated with the search display area separately from the auto-completed search query.

12. The method of claim 10, wherein the distinguishably displaying comprises:
displaying the auto-completed advertising word distinguishable from the auto-completed search query using one of a larger font, a different color, an underline or any combination thereof.

13. The method of claim 10, further comprising:
charging an account of an advertiser with an advertising cost for displaying the auto-completed advertising word on the user interface window, upon detection of the auto-completed advertising query being selected.

14. The method of claim 13, wherein charging comprises counting a number of clicks associated with the auto-completed advertising word; and
calculating the advertising cost based on the number of clicks.

15. The method of claim 13, wherein charging comprises displaying the auto-completed advertising word on the user interface window of a search display area during a period of time; and
calculating the advertising cost based on a number of clicks during the period of time.

16. The method of claim 7 wherein the displaying the auto-completed search query and the auto-completed advertising word comprises distinguishably displaying the auto-completed search query or the auto-completed advertising word according to a setting mode corresponding to the indexing.

17. One or more non-transitory computer-readable media comprising a computer executable program, which when executed by one or more processors, causes the one or more processors to perform a method, the method comprising:
indexing recommended search queries and advertising words related to the search queries by correlating the search queries and the advertising words according to one of a consonant/vowel, a syllable, a suffix or any combination thereof;
receiving in real-time a partial or full search query from a user terminal;
generating in real-time an auto-completed search query and an auto-completed advertising word based on the indexing; and
displaying causing display in re al-time of the auto-completed search query and the auto-completed advertising word in a user interface window associated with a search display area of the user terminal, the displaying including using a visual indicator to distinguish the auto-completed advertising word from the auto-completed search query.

\* \* \* \* \*